United States Patent [19]

Urata

[11] Patent Number: 4,688,137
[45] Date of Patent: Aug. 18, 1987

[54] SUPERCONDUCTING COIL DEVICE

[75] Inventor: Masami Urata, Yokohama, Japan

[73] Assignee: Kabushiki Kaisha Toshiba, Kawasaki, Japan

[21] Appl. No.: 793,429

[22] Filed: Oct. 31, 1985

[30] Foreign Application Priority Data

Nov. 9, 1984 [JP] Japan .................. 59-236269

[51] Int. Cl.[4] .................. H01F 7/22; H01F 5/08
[52] U.S. Cl. ................................... 361/141
[58] Field of Search ................... 361/141, 19

[56] References Cited

FOREIGN PATENT DOCUMENTS 2166440  8/1973  France .
54-19835 7/1979  Japan .

OTHER PUBLICATIONS

Article on the 31st Cryogenics Engineering Conference in Japan, 1984.
Abstract from vol. 8, No. 49 of Patent Abstracts of Japan, Mar. 6, 1984, "Protecting Circuit for Superconductive Magnet".
J. D. Taylor et al, "Quench Protection for A 2-MJ Magnet", IEEE Transactions on Magnetics, vol. Mag.-15, No. 1, Jan. 1979.
M. Masuda et al, "Superconducting Energy Storage Magnets", IEEE Transactions on Magnetics, vol. Mag.-15, No. 1, Jan. 1978.
"Research and Technical Notes", Cryogenics, vol. 19, No. 8, Aug. 1979, pp. 491-492.

Primary Examiner—Michael L. Gellner
Attorney, Agent, or Firm—Schwartz, Jeffery, Schwaab, Mack, Blumenthal & Evans

[57] ABSTRACT

A superconducting coil device in accordance with the present invention includes a cryostat formed by accommodating liquid helium, a superconducting coil which is accommodated in the cryostat along with liquid helium, a persistent current switch for short-circuiting the ends of the superconducting coil, and a thyristor connected to both ends of the persistent current switch. The gate electrode of the thyristor and the intermediate tap of the superconducting coil are connected via a resistor and/or diode. To both ends of the persistent current switch there are connected each of one end of leads that are formed by superconducting wire, and on the other ends of lead wires there are provided terminals. In addition, in the exterios of the cryostat there is provided a power supply for charging and discharging the superconducting coil by being connected selectively to that terminals.

5 Claims, 5 Drawing Figures

4,688,137

SUPERCONDUCTING COIL DEVICE

BACKGROUND OF THE INVENTION

1. Field of the Invention

The present invention relates to a superconducting coil device, and more particularly to a superconducting coil device which makes it possible to prevent damages to the thyristor that is provided for protecting the superconducting coil and/or the persistent current switch.

2. Description of the Prior Art

A superconducting coil device consists usually of a superconducting coil and a persistent current switch which short-circuits the superconducting coil that are accommodated in a cryogenic refrigerant represented by liquid helium.

Now, if the superconducting coil or the persistent current switch makes a transition for some reason to the resistive state while a superconducting coil device constructed as above is being operated in the persistent current mode, then the coil and the switch are in fear of being damaged by burning. For this reason, there is required some kind of protective system to cope with this kind of transition to the resistive state, that is, quenching. Of the various protective systems that can be thought of there has been proposed recently a system of protection that connects a diode to both ends of the superconducting coil, as shown by FIG. 1. According to this system, when a persistent current switch 14 is quenched while the device is being operated in the persistent current mode by cutting off the circuit 10 from a power supply 12, there is generated an inductive voltage between both ends of a superconducting coil 16. The voltage generated is directed in the forward direction of a diode 18 so that a current flows into the diode 18 to consume the energy accumulated in the superconducting coil 16, protecting the persistent current switch 14 and the superconducting coil 16. During operation of the device in the persistent current mode, the power leads 20 are separated for the purpose of suppressing heat flow into the cryostat, and the lead terminals 22 too are placed in a cryostat 24. Accordingly, the diode 18 is placed in the region of liquid helium or gaseous helium, namely, the cryostat 24.

When the persistent current switch 14 is quenched, the voltage between both ends of the superconducting coil 16, when the diode 18 begins to protect, is determined uniquely by the voltage-current characteristics of the diode 18. For a diode of 150 A class, current begins to flow at the voltage of the order of 10 V at 4.2K. In the case when the superconductor of the persistent current switch 14 is a perfectly stabilized conductor, it can happen that a part of the conductor for the persistent current switch 14 is quenched but the conductor reverts to the superconducting state. Even for such a case current sometimes flows into the diode 18. In the other hand, if several diodes 18 are connnected in series in order to prevent such malfunctioning of the diode 18, circuit protection may become impossible because of a large protection voltage that is applied continuously between the ends of the persistent current switch 14.

SUMMARY OF THE INVENTION

An object of the present invention is to provide a superconducting coil device which can reliably protect the circuit elements without malfunctioning.

Another object of the present invention is to provide a superconducting coil device which enables one to assemble a protective circuit that is operated at a desired value of the voltage when the superconducting coil is quenched.

Still another object of the present invention is to provide a superconducting coil device which, by means of a thyristor that is used as a protective element, can protect the coil and the switch by quickly turning in the thyristor when the superconducting coil or the persistent current switch is quenched, and moreover, can protect, after the thyristor was turned on, the thyristor itself by interrupting the gate current of the thyristor.

A feature according to the present invention is that the superconducting coil includes accommodating means which accommodates a cryogen refrigerant, a superconducting coil which is accommodated in the accommodating means along with the cryogenic refrigerant, a persistent current switch which is provided in the accommodating means so as to short-circuit the ends of the superconducting coil, a power supply equipment which is provided in the exterior of the accommodating means so as to be connected selectively to the ends of the superconducting coil in order to charge or discharge the superconducting coil, and a thyristor which is connected to both ends of the persistent current switch and of the superconducting coil. In addition, the gate of the thyristor is arranged so as to be connected to the intermediate tap which is located at a predetermined position of the superconducting coil, and the device includes a resistor and/or diode with predetermined resistance that is inserted between the gate of the thyristor and the intermediate tap of the superconducting coil.

These and other objects, features and advantages of the present invention will be more apparent from the following description of the preferred embodiments, taken in conjunction with the accompanying drawings.

DESCRIPTION OF THE PREFERRED EMBODIMENTS

Figure 1:
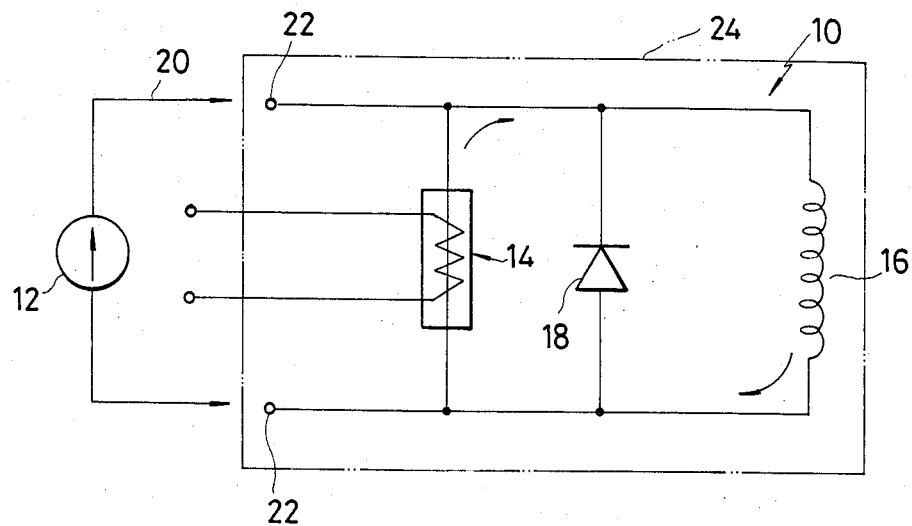
FIG. 1 is a simplified block diagram for a prior art superconducting coil device.
Figure 2:
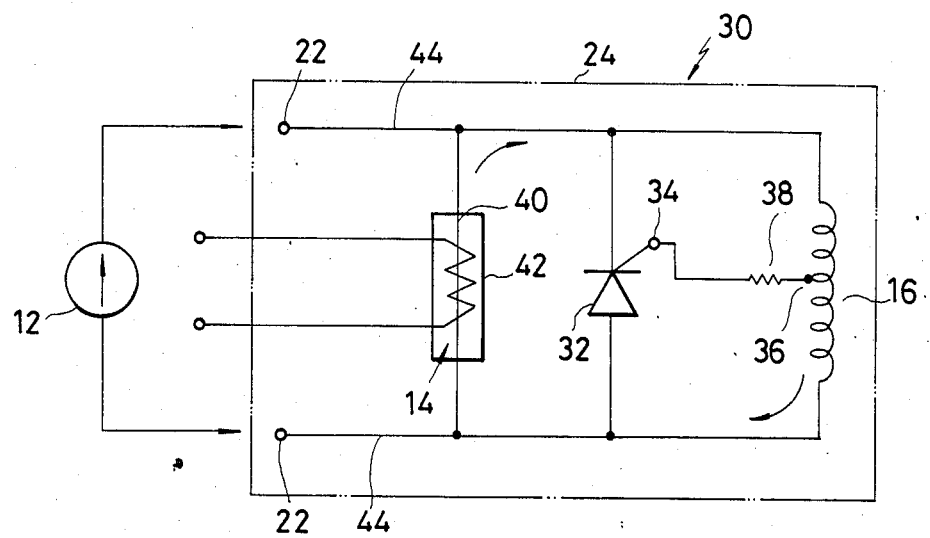
FIG. 2 is a simplified block diagram for a superconducting coil device in accordance with the present invention.

Referring to FIG. 2 which illustrates a superconducting coil device in accordance with the present invention that carries reference number 30, there is an arrangement to prevent damage by burning of the superconducting coil and the persistent current switch when there occurs a quenching in the persistent current switch.

Namely, the superconducting coil device includes a cryostat 24 which accomodates liquid helium, a superconducting coil 16 which is accommodated in the cryostat 24 along with liquid helium, a persistent current switch 14 which is connected to both ends of the superconducting coil within the cryostat 24 to short-circuit both ends of the superconducting coil 16, and a thyristor 32 which is connected by its anode and cathode, respectively, to both ends of the persistent current switch 14. The gate 34 of the thyristor 32 and the intermediate tap 36 of the superconducting coil 16 are connected via a resistor 38 with a predetermined value of resistance.

The persistent current switch 14 is constructed by winding electric heating element 42 on a superconducting wire 40. Both ends of the electric heating element 42 are led to the exterior of the cryostat 24. Further, both ends of the persistent current switch 14 are connected respectively to one end of each of lead wires 44 formed by superconducting wire, and on the other ends of these lead wires 44 there are provided respective terminals 22. In the exterior of the cryostat 24 there is provided a power supply 12 which charges or discharges the superconducting coil 16 through selective connection with the terminals 22.

According to the above construction, when the persistent current switch 14 is quenched, it becomes possible to prevent damage by burning of persistent current switch 14 and the superconducting coil 6.

Namely, suppose that a persistent current is flowing in the closed circuit formed by the superconducting coil 16 and the persistent current switch 14 in the direction as shown by the arrow in the figure. If in this state the persistent current switch 14 is quenched for some reason, the resistance of the persistent current switch 14 increases so that there will appear a voltage between the ends of the superconducting coil, and the voltage will build itself up. As the voltage increases in this manner, the voltage between the intermediate tap 36 of the superconducting coil 16 and the cathode of the thyristor 32 also increases, and a gate current flows in the thyristor via the resistor 38, turning on the thyristor 32. Then, the current that has been flowing in the persistent current switch 14 flows now through the thyristor 32. Therefore, damage by burning to the persistent current switch 14 and the superconducting coil 6 can be prevented reliably in this way.

Moreover, the thyristor 32 remains off when the gate voltage of the thyristor 32 is small. Therefore, for a voltage of order of magnitude of that which is generated in the superconducting coil 16 at the time when a part of the persistent currents switch 14 is shifted to the normally conducting state and then reverts immediately afterward back to the superconducting state, the thyristor 32 remains in the off-state. However, if the quenching that was started in a part of the persistent current switch 14 spreads over the entire region of the persistent current switch 14, at some point in the process of spreading of the quenching, the thyristor 32 turns on when the voltage of the superconducting coil 16 is elevated to a certain value, beginning the protection behavior of the thyristor 32. Therefore, it is possible to protect the persistent current switch 14 and the superconducting coil 16 in a reliable manner without mulfunctioning.

Figure 3:
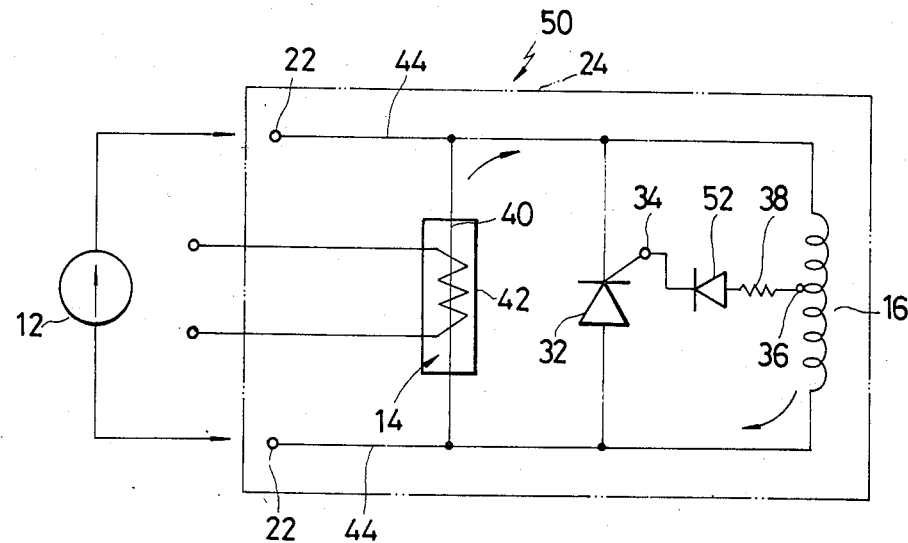
FIG. 3 is a simplified block diagram for a second embodiment of the superconducting coil device in accordance with the present invention.

Referring to FIG. 3, there is shown a second embodiment of the superconducting coil device in accordance with the present invention with reference numeral 50. In the embodiment, the elements identical to those in FIG. 2 are given identical symbols to omit further explanation. In the second embodiment, differing from the first embodiment, there is connected, in series with the resistor 38 and in forward direction, a diode 52 between the gate 34 of the thyristor 32 and the intermediate tap 36 of the superconducting coil 16. Therefore, in addition to the effects in the first embodiment, there is available additional effect that prevents reliably the damages to the thyristor 32.

Figure 4:
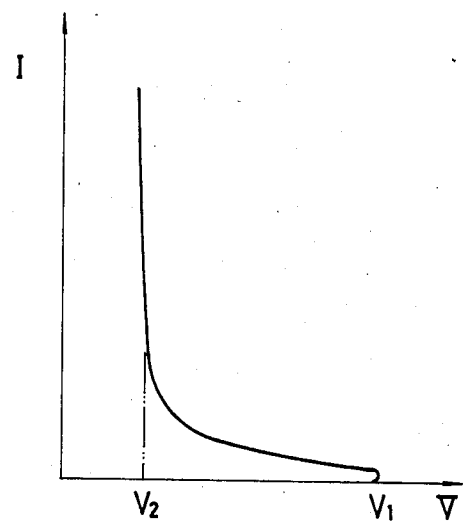
FIG. 4 is a graph for illustrating the forward direction characteristics of the diode under the cryogenic condition in order to describe the operation of the second embodiment shown in FIG. 3.

Namely, the forward characteristics of the diode 52 when it is cooled to the temperature of liquied helium, differs very much from the characteristics at the room temperature. As shown by FIG. 4, at such a low temperature, forward current will not flow until the voltage is decreased below a certain threshold value $V_1$, and a current begins to flow when the forward voltage exceeds the threshold voltage, with rapid drop in the voltage. The threshold value $V_1$ is normally 10–20 V, and the voltage $V_2$ at which the current flows continuously is 1–2 V. On the other hand, the voltage that appears between the ends of the superconducting coil 16 when the persistent current switch 14 is quenched is move than 100 V. Therefore, as soon as the persistent current switch 14 is quenched, it is possible to have enough flow of a gate current to turn on the thyristor 32 through the diode 52. When the thyristor 32 is turned on, the voltage between the ends of the superconducting coil 16 drops to the current flowing voltage of the thyristor 32. This threshold voltage is normally below 2 V. Because of this, the voltage between the intermediate tap 36 of the superconducting coil 16 and the cathode of the thyristor 32 also drops rapidly to a level below the threshold voltage $V_2$ of the diode 52. Then, the diode 52 enters the off-state and the supply of the gate current of the thyristor is stopped automatically.

In this manner, when quenching starts in the persistent current switch 14, it becomes possible to prevent damage by burning out of the persistent current switch 14 by bypassing the current that was flowing in the persistent current switch 14 to the thyristor 32, as well as to interrupt automatically the supply of gate current to the thyristor 32. That is; after the thyristor was turned off, the gate current will not continue to flow so that damage to the thyristor 32 can reliably be prevented. In addition, in this embodiment, it can also prevent the application of an inverse voltage to the gate of the thyristor 32 while the coil is being charged, because of the presence of the diode 52.

Figure 5:
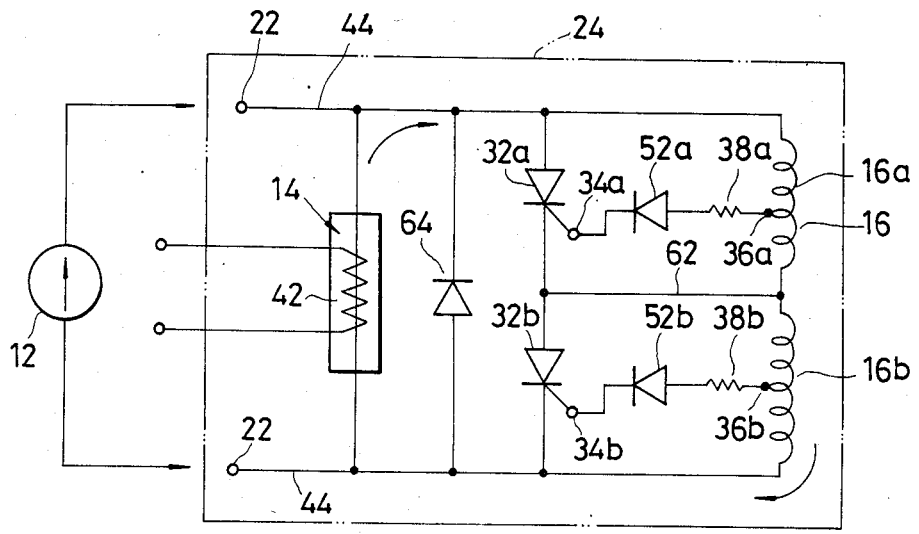
FIG. 5 is a simplified block diagram for a third embodiment of the superconducting coil device in accordance with the present invention.

Referring to FIG. 5, there is shown a third embodiment of the superconducting coil device according to the present invention in which the elements identical to those in FIG. 3 are assigned identical symbols to omit further explanation on the equivalent parts. Analogous to the second embodiment, the third embodiment is arranged to prevent damages by burning out of the coil when there occurred a quenching in the superconducting coil.

Namely, the superconducting coil 16 is essentially constructed by connecting two superconducting coils 16a and 16b in series. Between the ends of the superconducting coil 16 (or between the ends of the persistent current switch 14) there are connected in series two thyristors 32a and 32b with their polarities as shown in the figure. Further, the junction of the thyristors 32a and 32b and the junction of the superconducting coils 16a and 16b. are connected by a wire 62 with large electrical capacity. To each of the superconducting coils 16a and 16b there are provided respectively intermediate taps 36a and 36b, and these intermediate taps 36a and 36b are connected to the gate electrodes 34a and 34b of the corresponding thyristors 32a and 32b via respective reistors 38a, 38b and diodes 52a, 52b of the forward direction. Further, to prevent damages by burning out of the persistent current switch 14 when there occurred a quenching in the switch 14, there is connected a diode 64 in parallel to the switch 14.

With such a construction, when there occurred a quenching in either of the superconducting coils 16a and 16b, damage by burning to the coil can be prevented in the following way.

Namely, suppose that there is flowing a persistent current in the closed circuit formed by the superconducting coils 16a and 16b and the persistent current switch 14, as shown by the arrow in the figure. If in such a state there occurs a quenching at a portion situated betweed the intermediate tap 36b of the superconducting coil 16b and the cathode of the thyristor 32b, then the resistance of that portion will be increased. Because of this, there appears a voltage between the intermediate tap 36b and the cathode of the thyristor 32b, and when the voltage is increased to exceed the threshold value $V_1$ of the diode 52b, a gate current flows in the thyristor 32b to turn on the thyristor 32b. Then, the current that has been flowing in the superconducting coil 16b flows now in the route of the superconducting wire 62 and the thyristor 32b, preventing damage by burning to the superconducting coil 16b. When the thyristor 32b is turned on, the voltage between the ends of the superconducting coil 16b drops to a level of the current flowing voltage, namely, below 2 V, of the thyristor 32b. Consequently, the voltage between the intermediate tap 36b and the cathode of the thyristor 32b drops also to a level below the threshold voltage $V_2$ of the diode 52b. This prevents the flow of a current any more and brings the diode 52b to off-state. Therefore, when a quenching occurs in the superconducting coils 16a and 16b, it becomes possible in this way to prevent damage by burning out to the coils 16a and 16b as well as to prevent damages to the protective thyristors 32a and 32b. It might be mentioned that although in each of the embodiment there is inserted a resistor in the gate circuit of the thyristor in series with the diode, the resistor is not absolutely needed, as may be clear from the description in the foregoing. The positions of the intermediate taps do not have to be as shown in the embodiments either.

In summary, according to the superconducting coil device of the present invention, when there occurred a quenching in the superconducting coil or the persistent current switch, it becomes possible not only to prevent reliably damages by burning out the coil or the switch by quickly diverting the current that was flowing in these elements to the thyristor circuit, but also to prevent reliably damages to the thyristor due to the presence of the diode that is inserted in the forward direction at a predetermined position between the gate of the thyristor and the superconducting coil.

Various modifications will become possible for those skilled in the art after receiving the teachings of the present disclosure without departing from the scope thereof.

What is claimed is:

1. A superconducting coil device, comprising:
   (a) accommodating means for accommodating a cryogenic refrigerant;
   (b) a superconducting coil having two ends and being immersed in the cryogenic refrigerant;
   (c) a persistent current switch having two ends connected, respectively, to said ends of said superconducting coil so as to short-circuit said superconducting coil;
   (d) a power supply provided outside of said accommodating means for connection selectively to the ends of said superconducting coil for charging and discharging said superconducting coil;
   (e) a thyristor which is immersed in said cryogenic refrigerant and having an anode and a cathode, respectively, to the ends of said persistent current switch and the ends of said superconducting coil,
   (f) said thyristor having a gate which makes electrical contact with an intermediate tap of said superconducting coil; and
   (g) a diode which is immersed in said cryogenic refrigerant and connected in the forward direction between the gate of said thyristor and the intermediate tap of said superconducting coil.

2. A superconducting coil device as claimed in claim 1, in which a resistor is further connected in series with said diode between the gate of said thyristor and the intermediate tap of said superconducting coil.

3. A superconducting coil device as claimed in claim 2, in which said thyristor is constructed such that, when said persistent current switch is quenched, said thyristor is turned on by a flow of gate current via said diode and said resistor generated by an increase of the voltage between the intermediate tap of said superconducting coil and the cathode of said thyristor, and the diode is constructed such that, when the thyristor is turned on and the voltage between the intermediate tap of the superconducting coil and the cathode of the thyristor drops rapidly to a level below the current flowing voltage of the diode due to the voltage between the ends of the superconducting coil dropping to the current flowing voltage of the thyristor, the diode enters an off-state to automatically interrupt the supply of gate current to the thyristor.

4. A superconducting coil device as claimed in claim 1, in which said accommodating means comprises a cryostat, and in which the cryogenic refrigerant comprises liquid helium.

5. A superconducting coil device as claimed in claim 1, in which said persistent current switch comprises an electric heating element wound on a superconducting wire.

* * * * *